Aug. 19, 1958  G. W. SHEREN  2,848,250
SAFETY BELT

Original Filed Sept. 22, 1952  2 Sheets-Sheet 1

INVENTOR.
GLENN W. SHEREN

Aug. 19, 1958  G. W. SHEREN  2,848,250
SAFETY BELT
Original Filed Sept. 22, 1952  2 Sheets-Sheet 2
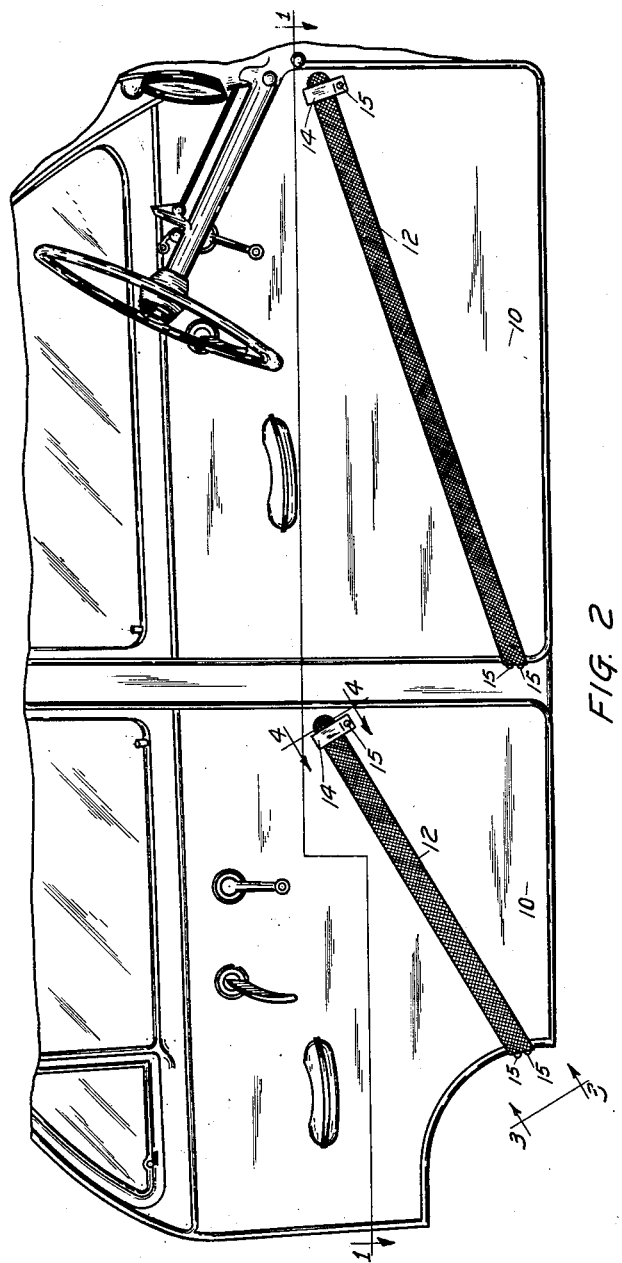
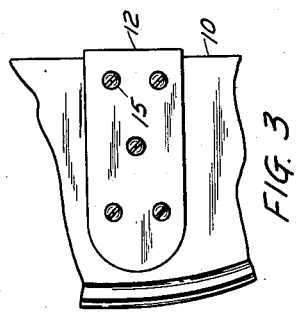
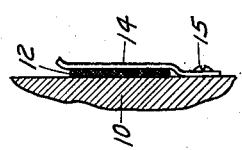
INVENTOR.
GLENN W. SHEREN

United States Patent Office 2,848,250
Patented Aug. 19, 1958

2,848,250

SAFETY BELT

Glenn W. Sheren, Mason, Mich., assignor of one-half to Harley Vansickle, doing business as Karbelt Manufacturing Company, Mason, Mich.

Continuation of abandoned application Serial No. 310,884, September 22, 1952. This application December 27, 1955, Serial No. 555,327

9 Claims. (Cl. 280—150)

The present inventon relates to safety devices for motor vehicles and more particularly to a safety belt system for preventing an occupant of a motor vehicle from being thrown from the vehicle and for maintaining the structural integrity and strength of the body members of the vehicle.

Fatalities result in motor vehicle collosions from many causes. One of the more predominant causes of fatalities is from the injuries received when an occupant of the vehicle is thrown out of the vehicle through an open door. Another cause of fatalities is the injury received by the occupant being pinned inside of the vehicle when the body of the vehicle is crushed, as upon rolling. Both of these types of injuries are fostered by the loss of a vehicle body member which normally contributes to the structural integrity of the motor vehicle. The removal of a major strength contributing member reduces the ability of the structure to resist sudden stress and strain. In present automotive design wherein the minimization of weight has become an important factor, the structural design of the body has been engineered to give maximum strength with minimum weight when intact. The loss of a major structural body member, such as a door, materially reduces the integrity of the structure and thus reduces the structure's ability to resist sudden and heavy stresses such as the impact of a collision. Many safety belts have been designed for use by occupants of automobiles. These belts have, when used, materially reduced fatal injuries received by the occupants in automobile collisions. However, no known belt has been provided which will maintain the structural integrity of the vehicle by insuring that the doors are maintained in a closed position, thereby providing a structure having the abiilty to resist distortion incident to the impact of a collision.

It is, therefore an object of the present invention to provide a safety belt system which will maintain the doors of the vehicle in a closed position upon impact of collision.

Another object of the present invention is to provide a safety belt system which will retain the rider in the seat of the automobile upon impact of collision and which system has one end of one belt connected to the door of the vehicle body and one end of the other belt connected to the floor of the vehicle.

Another object of the present invention is to retain the automobile doors in a closed position on impact of collision to retain the maximum structural strength of the vehicle body and frame whereby the vehicle body will resist the crushing effect of the impact of collision or rolling.

A still further object is to provide a safety belt system which is adaptable to most present day motor vehicle designs while minimizing clutter within the automobile.

These and other objects will become apparent as the description proceeds.

In the drawings:

Figure 2 is a side elevation view from the interior of a four door vehicle looking toward the driver's side and shows the door belts in their stored position with the end of each belt secured in a spring clip.

Figure 3 is a partial rear elevation of an automobile door and shows the manner of securing the door connected belt to the door.

Figure 4 is a sectional elevation of the spring clip and shows the belt held thereby.

General Description

Figure 5:
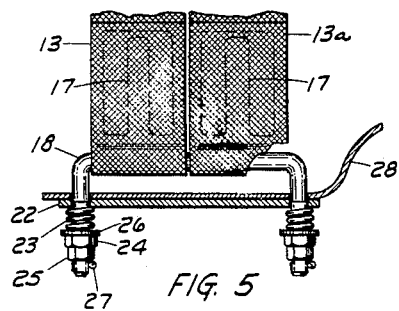
Figure 5 is a rear elevation of the center belt securing means taken on line 5—5 of Figure 1 and shows the resilient mounting of the U bolt through the floor board and shows the presser plate for distributing the load of the U bolt across the floor boards.
Figure 6:
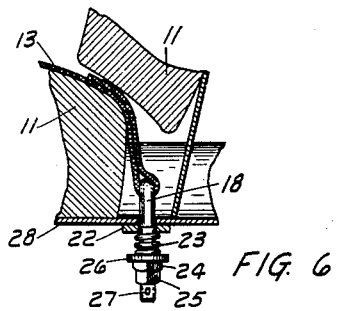
Figure 6 is a sectional elevation view on line 6—6 of Figure 1 and shows the manner in which the center belt is secured to the U bolt and the manner in which the center belt passes upwardly between the seat cushion of an automobile.

In general, the present invention consists of a safety belt system comprising two matingly buckled torso encircling belts secured within the automobile, one belt secured to the door of the vehicle and the other belt secured to the floor boards near the longitudinal center line of the vehicle. The belt secured to the door, hereinafter referred to as the door belt, is secured to the rear vertical edge of the door near the bottom of the door. The door belt is secured in such a manner as to be diagonally transverse to the inner door surface at an upward angle toward the front edge of the door where the free end of the door belt is held in a spring clip when not in use. The other belt, hereinafter referred to as the center belt, is secured to the floor boards of the vehicle near the longitudinal center line thereof and directly behind the seat. The center belt is provided with a loop at one end for attachment to the floor board securing means. At the other end of the center belt a buckle is provided engaging the free end of the door belt. It is thus apparent that a belt system has been provided which will retain an occupant in his seat and which will also maintain the door adjacent the occupant in a closed position at all times when the belt is in service. As will be seen, the structure herein described is applicable to substantially all automobile seats, front and rear. It will be understood as the description proceeds that directions such as front, rear, side and the like have reference to a normal automobile wherein "front," for example, has reference to the end of the automobile proceeding first in the usual direction of forward travel.

Specific description

Referring with more particularity to the drawings the present invention includes a pair of belts 12 and 13 within an automobile. One of the belts 12 is secured to a door 10 of the automobile and the other belt 13 is secured to the floor board 28 of the automobile. The belt 12, known as the door belt, is secured to the door 10 on the rear vertical edge near the bottom of the door as clearly shown in Figures 1 and 2, as by fastening means 15. The fastening means 15 in Figure 3, shown as screws 15, pass through the door belt 12 and into the metal frame of the edges of the door. The fasteners 15 are arranged to press against one end of the door belt 12 to insure a good flush holding of the belt 12 to the door 10. The door belt 12 is secured to the door 10 in such a manner that the belt 12 will traverse in a diagonally generally upward manner, across the inner face of the door 10. Near the upper extent of the free end of the door belt 12, in its diagonal position across the inner door surface, is a clip 14 being a generally flat plate having an offset portion as illustrated in Figure 4 to retain the door belt 12 between the inner surface of the offset portion of the plate 14 and the inner surface of the door 10. The portion of the plate 14 below the offset is provided with a hole for receiving a fastener 15 therethrough. The clip 14 must be positioned on the inner surface of the door 10 so that the fastener 15 will engage a structural member of the door body to insure good holding.

Figure 1:
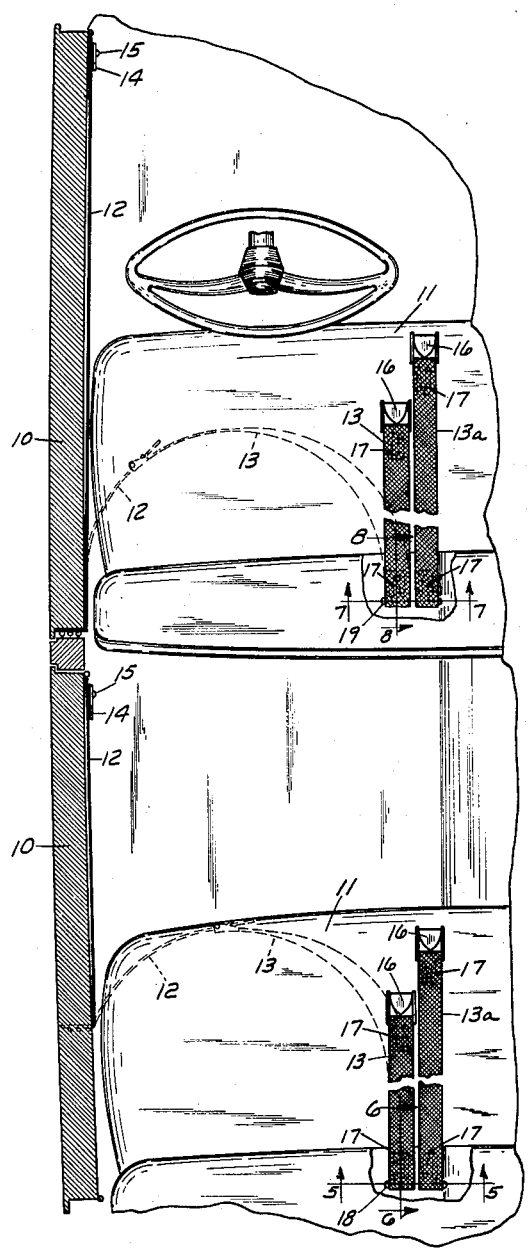
Figure 1 is a partial plan view through the body of a four door vehicle and shows the safety belt system for each door in the position in which the belts are stored when not in use and illustrates in dotted line the position of the belts when in service.

The other belt, known as the center belt 13, is secured by floor fastening means to the floor board 28 of an automobile near the longitudinal center-line of the vehicle, generally shown in Figures 1, 5, 6, 7 and 8 as adjacent the drive shaft tunnel in the floor 28 of the automobile. The center belt 13 is provided at the free end with a buckle 16 to receive the free end of the door belt 12 as shown in dotted line in Figure 1. The other end of the center belt 13 is secured to the floor fastening means by looping the end of the belt 13 back on to itself as best shown in Figure 5 and stitching the lapped material as at 17 in Figures 5 and 7. The loop thus provided in the stitched end of the center belt 13 is slipped over a U-shaped bolt 18. The free end of the center belt having the buckle 16 is passed upwardly between the back of the seat 11 and the seat cushion and lays flat on the cushion when not in use as shown in Figure 1. The U-shaped bolt 18 has each leg threaded to receive nuts 24 and 25, respectively. A relatively fine thread series is used, and generally a selected thread such as is used in aircraft work to prevent backing off of the nuts due to vibration has been found satisfactory. The end of the threaded U-bolt 18 is provided with a hole to receive a cotter key 27 when the nuts 24 and 25 are in position. The floor of the vehicle is provided with holes to matingly receive the threaded ends of the U-bolt 18. A presser plate 22 is also provided having two holes to matingly receive therethrough the threaded ends of the U-bolt 18 when the U-bolt 18 is passed through the floor boards 28. The presser plate 22 distributes the load of the center belt 13 over a greater area of the floor boards 28 than could be done if only nuts 24 and 25 were used to bear against the floor boards 28. A spring 23 is provided for each threaded end of the bolt 18 and bears against the presser plate 22. The nuts 24 and 25 are threaded onto the legs of the U-bolt 18 and locked in position against backing off by cotter key 27. A thrust washer 26 interposed between the spring 23 and nut 24 serves as a satisfactory spring retainer.

Figure 7:
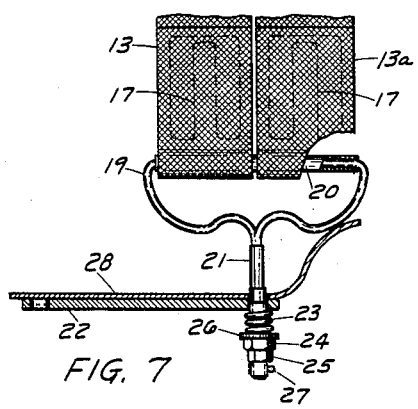
Figure 7 is a rear elevation view on line 7—7 of Figure 1 and shows a modified center belt securing means utilizing a wire loop and shows in partial section the tube diameter expander.
Figure 8:
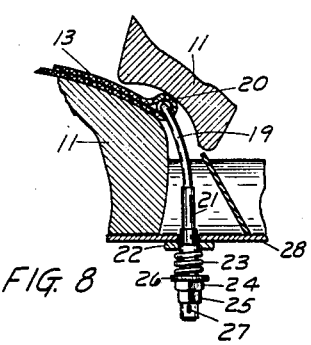
Figure 8 is a sectional elevation view on line 8—8 of Figure 1 and shows in side elevation the modified center belt securing means of Figure 7.

Various modifications can be made in the present invention without departing from the spirit and scope thereof. For example, one such modification of the center belt floor board securing means is shown in Figures 7 and 8. A woven wire rope or cable 19 is formed into a loop having a tubular cylinder 20 surrounding the loop in the cable 19 to increase the diameter of the wire rope 19 and to form a straight belt receiving portion. The cylinder 20 is also provided to protect the center belt 13 from tearing due to the rough texture of the wire rope surface. The ends of the wire rope 19 are joined in a tube 21 and are held therein by known methods such as, for example, the method of securing a wire rope into a metal shackle. The tube 21 is provided with thread means to receive the nuts 24 and 25, and cotter key 27 as described hereinbefore. Thus, only a single hole on the floor boards 28 is needed when using the modified cable type center belt receiving means. As shown in Figures 1, 5 and 7 an additional center belt 13a is attached to the floor connecting means and as illustrated will be understood to extend in use to encircle passengers on the right and left hand side of an automobile. With reference to the position of the buckle 16, it will be appreciated that it is attachable to either the center belt 13 or door belt 12.

*Operation*

The safety belt system of the present invention when constructed in the manner illustrated in the drawings and described above, effectively maintains the door of the automobile in a closed position and prevents the occupant from being thrown from the vehicle. When the door 10 of the vehicle is closed after entering, the door belt 12 can be removed from the spring clip 14 and drawn around the torso of the occupant as shown in Figure 1. The free end of the door belt is slipped into the buckle 16 of the center belt 13 and the door belt 12 is drawn through the buckle 16 until the belts are drawn snugly against the torso. If and when a collision occurs, the vehicle is normally brought to a sudden stop. The occupant, however, if not wearing a safety belt, does not stop. The momentum of the torso throws the torso forward or towards the direction of travel. The occupant then is thrown against the windshield or through the windshield, frequently receiving fatal injuries therefrom. The doors of the automobile are sprung open and the frame is distorted on impact of collision. The occupant can then be, and often times is, thrown out of the open door violently striking the pavement and sustaining serious injuries. When thrown clear of the vehicle he may be crushed by his own or other vehicles and may sustain serious and frequently fatal injuries. However, if the occupant is wearing the safety belt of the present invention he is retained as a part of the vehicle and is brought to a stop with the vehicle, since his torso is secured to the vehicle by the belt. Further, the belt being secured to the door, the door is maintained in a closed position because even upon distortion of the automobile frame and failure of the door latch, the belt will hold the door in place until the distorting impact stress is absorbed. The occupant need merely trip the belt buckle 16 after the impact to free himself from the belt system and permit the door 10 to be opened.

If the occupant is unconscious, the belts can be easily removed by a third person from outside the automobile by reaching through a window and tripping the quick-release buckle 16 of the center belt 13. This action releases the occupant and, at the same time, allows the door 10 to be opened to remove the occupant.

The maintaining of the door 10 in a closed position materially increases the ability of the automobile body to resist crushing and lessens the changes of the occupant being injured or crushed by the collapse of the body of the automobile itself.

While reference throughout the description has been made to a single installation for automobiles it will be understood that the present invention admits of installation for securing all of the occupants of a vehicle against injury and such plural arrangements are intended to be made a part of the present description.

The present application is a continuation of my previous application filed on September 22, 1952 and bearing Serial Number 310,884; for Safety Belt, now abandoned.

Having thus described a clear embodiment of my invention it will be understood that modifications within the skill of the art are intended to be included herein, limited only by the scope of the hereinafter appended claims.

I claim:

1. A safety device for motor vehicles comprising in combination with a vehicle body having a front seat and a side door, a door belt, the said door belt being diagonally disposed along the inside wall of the door, said door belt having one of its ends firmly secured to the outer edge of the door, a clip, said clip being secured to the front portion of the inside wall of the door, the other end of the said door belt being secured to said clip while said door belt is not in use, a floor belt, an expansion loop, the said expansion loop being secured to the floor adjacent the seat at a point about midway across the vehicle by means of a bolt, said floor belt being secured to said expansion loop, said expansion loop including a tube disposed around a portion of a cable in the form of a loop, a buckle, said buckle being securely disposed to said floor belt, the free end of said floor belt being connectable with the free end of the door belt for securing an occupant to the vehicle.

2. In a safety belt system attached to the door and floor of an automobile for maintaining the structural integrity of the vehicle in relation to the seated occupants thereof, the combination including: a door belt having one end secured to the lower rear vertical edge of an automobile door and extending diagonally upward and across the inner face of the door; a spring clip positioned on the inner face of the door for retaining the free end of said door belt in secure relationship to said door when said door belt is not in use; a center belt extending upwardly between the cushion and seat back to lie flat on the cushion when not in use; floor connecting means behind the automobile seat and adapted to securely anchor one end of said center belt; and a quick release buckle attached to the free end of one of said belts for adjustably locking the other of said belts thereto and around an occupant.

3. In a safety belt system as set forth in claim 2, the combination wherein said floor connecting means includes: a U-shaped member threaded at the extremities of its legs and adapted for receiving said center belt; a presser plate provided with mating openings for receiving the legs of said U-shaped member; spring means around each of the legs of said U-shaped member; a pair of nuts on each leg of said U-shaped member adjustably bearing on said spring means and having a selected thread fit substantially secure against vibrational loosening; and key means through said legs positively locking said nuts against loss.

4. A safety belt system for an automobile wherein safety belts are attached to each door and the floor of the automobile for maintaining the structural integrity of the vehicle in relation to the seated occupants thereof, the combination including: a door belt for each door of the vehicle, each of said door belts having one end secured to the lower rear vertical edge of the automobile doors and extending diagonally upward and across the inner face of each of the doors; a spring clip positioned on the inner face of each door for retaining the free end of said door belt in secure relationship to the door when said door belt is not in use; a pair of center belts extending upwardly between the cushion and seat backs of each cushioned seat of the automobile to lie flat on the cushion when not in use; floor connecting means behind each automobile seat adapted to securely anchor one end of each of said pair of center belts; and a quick release buckle attached to the free end of each center belt for adjustably locking each of said door belts to selected said center belts and the occupants.

5. A safety belt system as set forth in claim 4, the combination wherein said floor connecting means includes: a U-shaped member threaded at the extremities of its legs and adapted for receiving said center belts; a presser plate provided with mating openings for receiving the legs of said U-shaped member; spring means around each of the legs of said U-shaped member; a pair of nuts on each leg of said U-shaped member adjustably bearing on said spring means and having a selected thread fit substantially secure against vibrational loosening; and key means through said legs positively locking said nuts against loss.

6. In a safety belt system attached to a door and floor of an automobile for maintaining the structural integrity of the vehicle in relation to seated occupants, the combination including: a belt structure having one end secured to a door below and rearwardly of the forward edge of a seat cushion; another portion of said belt structure being attached to the floor of the vehicle at a point below and rearwardly of the forward edge of the seat cushion, said belt structure when in operative position, relative to an occupant of the seat cushion, being disposed above and inwardly from the forward edge of said seat cushion whereby opening of the door is restrained by said belt structure and relative opening movement between said door and vehicle floor will increase the retention of the occupant by said belt structure to said seat cushion.

7. A safety belt system as set forth in claim 4, the combination wherein said floor connecting means includes: a looped cable having two ends; a tube disposed around a portion of the said looped calbe providing an anchoring surface for one of each of said pair of center belts; a tubular bolt receiving the ends of said cable; fastening means securing said tubular bolt to the floor of the vehicle at a point about midway across the vehicle.

8. In a safety belt system as set forth in claim 2, the combination wherein said floor connecting means includes: a wire loop joined at its ends and adapted to receive a belt; a cylindrical tube through which said loop is passed; a cylindrical externally threaded member adapted to pass through the floor of an automobile and rigidly securing the ends of said loop; a presser plate forming an annulus about said threaded member; spring means bearing on said presser plate and fitting over said threaded member; a pair of nuts having a selected thread fit substantially secure against vibrational loosening and being matingly threadable on said threaded member and urging said spring means into resilient contact with said presser plate and urging through said presser plate transmission of stresses to the floor of an automobile; and key means through said cylindrical threaded member positively securing said nuts against loss.

9. A safety belt system as set forth in claim 4, the combination-wherein said floor connecting means includes: a wire loop joined at its ends and adapted to securely anchor one end of each of said pair of center belts; a cylindrical tube through which said loop is passed; a cylindrical externally threaded member adapted to pass through the floor of an automobile and rigidly securing the ends of said loop; a presser plate forming an annulus about said threaded member; spring means bearing on said presser plate and fitting over said threaded member; a pair of nuts having a selected thread fit substantially secure against vibrational loosening and being matingly threadable on said threaded member and urging said spring means into resilient contact with said presser plate and urging through said presser plate transmission of stresses to the floor of an automobile; and key means through said cylindrical threaded member positively securing said nuts against loss.

References Cited in the file of this patent

UNITED STATES PATENTS

| 1,321,742 | Hendricks | Nov. 11, 1919 |
| 1,973,011 | Morrison | Sept. 11, 1934 |
| 2,071,903 | Shively | Feb. 23, 1937 |
| 2,280,694 | Embree | Apr. 21, 1942 |
| 2,649,319 | Gledhill | Aug. 18, 1953 |
| 2,670,967 | Kean | Mar. 2, 1954 |
| 2,710,649 | Griswold | June 14, 1955 |

FOREIGN PATENTS

| 551,770 | Great Britain | Mar. 9, 1943 |